F. F. WEISHAAR & F. W. JACKSON.
ELECTRIC SWITCH.
APPLICATION FILED NOV. 19, 1915.
1,208,866.
Patented Dec. 19, 1916.
2 SHEETS—SHEET 1.
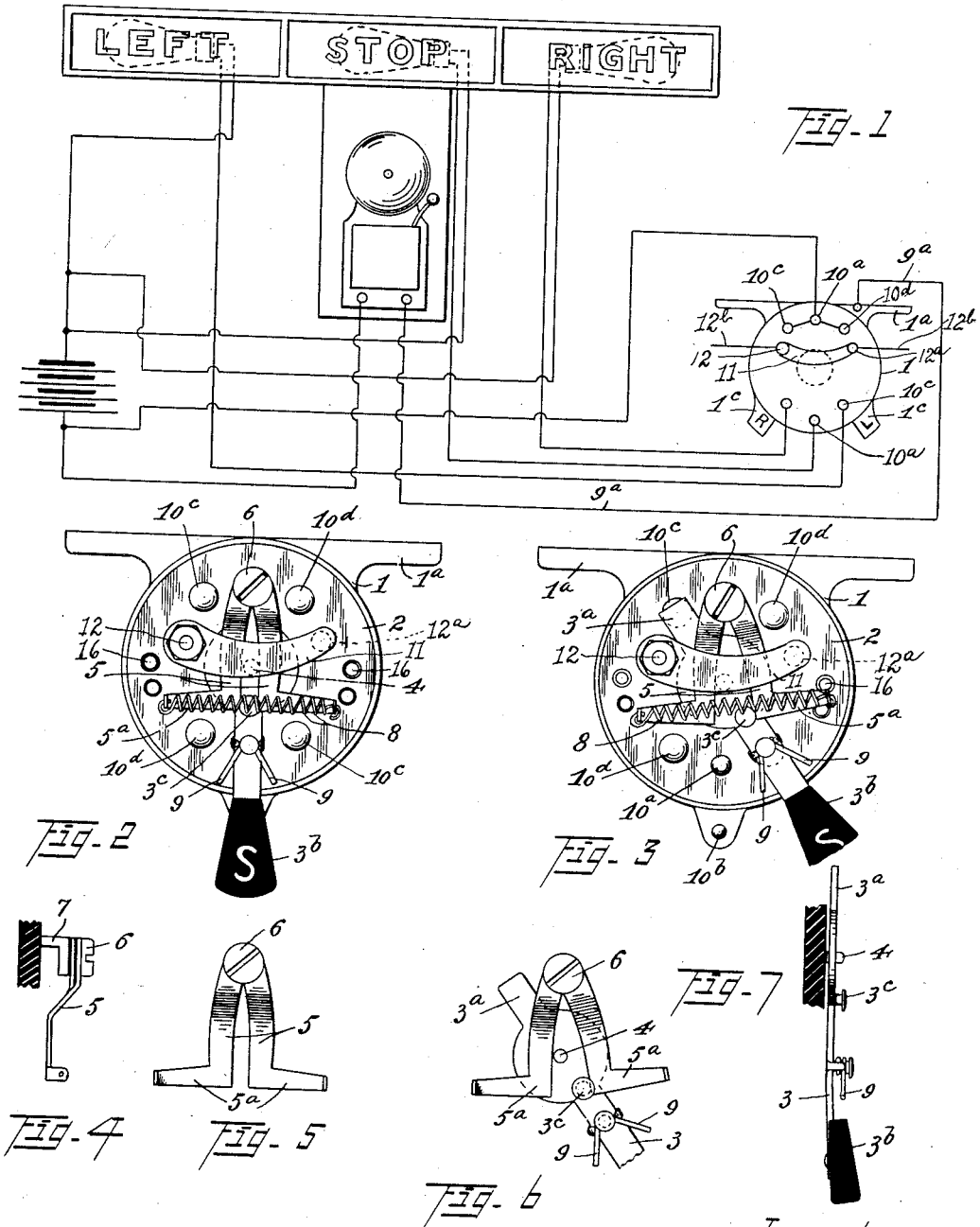

UNITED STATES PATENT OFFICE.

FRED F. WEISHAAR, OF CLEVELAND, AND FRED W. JACKSON, OF ELYRIA, OHIO.

ELECTRIC SWITCH.

1,208,866.  Specification of Letters Patent.  Patented Dec. 19, 1916.

Application filed November 19, 1915. Serial No. 62,370.

*To all whom it may concern:*

Be it known that we, FRED F. WEISHAAR and FRED W. JACKSON, citizens of the United States, residing at Cleveland and Elyria, respectively, in the counties of Cuyahoga and Lorain, respectively, and State of Ohio, have invented certain new and useful Improvements in Electric Switches, of which the following is a specification.

Our invention relates to improvements in electric switches for use in connection with a plurality of electric circuits, as in electric signaling, and the like, the present embodiment of this invention being particularly designed and adapted for use in connection with a rear signaling device adapted to be used at the rear of motor vehicles such as automobiles, motor trucks, and other self-propelled vehicles.

The primary object of the invention is to provide a generally improved electric switch of this class which may be mounted within convenient reach of the chauffeur or driver of the vehicle and which may be readily and conveniently operated so as not only to indicate through a signal at the rear the direction or turn which the vehicle is to take, as for example, to the "right" or to the "left" but which will at the same time sound the bell in such connection, a suitable push button being also provided adapted to operate an electric horn in the usual manner.

A further object is the provision of a compactly built switch of this class which will be exceedingly simple in construction, cheap of manufacture, and efficient in use.

With the above mentioned and other ends in view, the invention consists in the novel construction, arrangement, and combination of parts, hereinafter described, illustrated in one of its embodiments in the accompanying drawings, and particularly pointed out in the appended claims.

Figure 8:
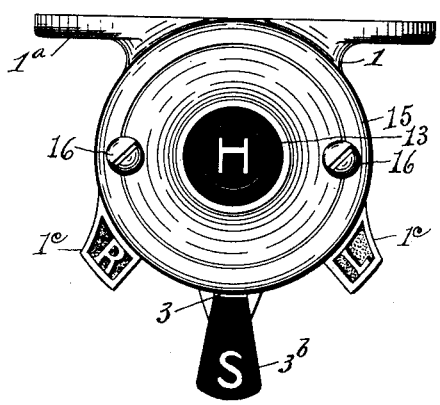
Figure 9:
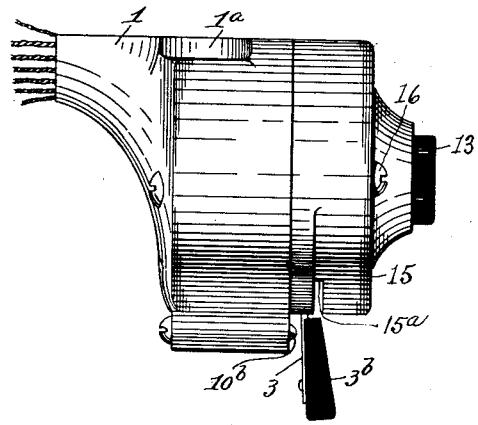
Figure 10:
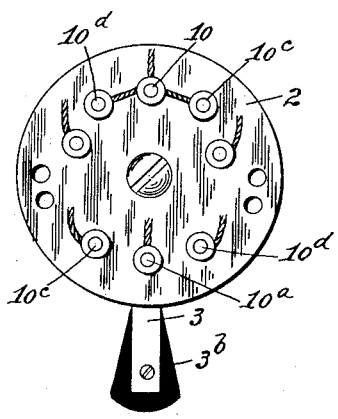
Figure 11:
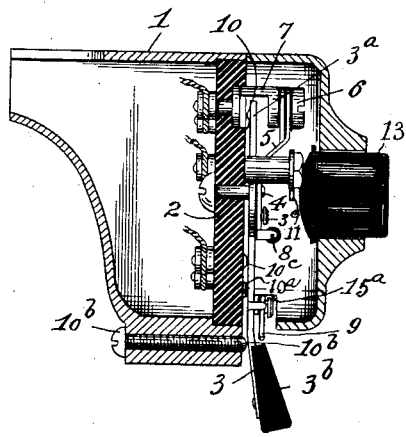

Referring to the drawings, forming a part of this specification, Figure 1, is a diagrammatic view of the improved switch and its various circuits or conduits in connection with a suitable rear signaling device for automobiles. Fig. 2, a top plan view of the switch, proper, the top cap or cover being removed for the purpose of clearer illustration of the parts, the improved pivotally mounted spring resisted switch lever being in neutral or normal position so that when the lever is depressed downwardly it will make circuit with the "stop light" and ring the bell shown at the center of the signaling panel of Fig. 1. Fig. 3, a similar view showing the switch lever moved to the right or into engagement with the stud marked "L" (see Figs. 1 and 8) to make contact with suitable contact elements making circuit with a light in the position on the tail panel marked "Left" in Fig. 1 of the drawings and also simultaneously making circuit with the electric bell. Fig. 4, a detail side elevation of the spring connected and actuated levers for coöperating with and serving to maintain the switch lever in neutral position, the spring and switch lever being removed for the purpose of clearer illustration of the parts. Fig. 5, a top plan view of the same detached. Fig. 6, a top plan view of the same in connection with the switch lever in the position indicated in Fig. 3 of the drawings. Fig. 7, a further detached view showing the switch lever in side elevation, the spring connected and actuated coöperating levers shown in Figs. 4 and 5 being removed for the purpose of clearer illustration of the details of the switch lever. Fig. 8, a top plan view of the improved switch, proper, in complete assembled position. Fig. 9, a side elevation of the same. Fig. 10, an underside view of the insulating switch block or base detached from the switch bracket or casing. Fig. 11, a central sectional view of the improved switch complete, the parts being in normal or neutral positions.

Similar numerals of reference designate like parts throughout all the figures of the drawings.

The improved switch comprises a suitable casing or bracket 1, provided, in the present instance, with a pair of attaching lugs 1ª, whereby the same may be readily attached and secured to the body of the vehicle in suitable proximity to the chauffeur or driver of the vehicle, and is provided with a suitable insulating block 2, upon which the various contact elements or electrodes and the working parts of the improved switch are mounted.

The casing or bracket 1, is formed of brass or other suitable conducting material and the switch lever 3, is pivotally mounted at the center of the insulating block 2, through the medium of a suitable pivot bar 4, and is provided with an arm or spring contact member 3ª, adapted to make contact with suitable contact elements hereinafter referred to in accordance with the various positions assumed by the switch lever. The lever 3, is preferably formed of suitable flexible conducting material and is provided with a non-conducting handle 3$^b$, of suitable non-conducting material such as hard rubber or the like.

As a means of resisting the action of the switch lever 3, when moved from its normal or neutral position as well as returning such switch lever to its normal position after being manually moved to its respective shifted positions, a pair of pivotally mounted spring resisted and actuated levers 5, are pivotally mounted above the switch lever 3, through the medium of a pivot screw 6, mounted on a bearing bracket 7, said levers 5, being adapted to coöperate with the switch lever 3, through the medium of a stud or pin 3$^c$, interposed between the free or angular portions 5$^a$, of the levers 5, the oppositely extending arms of the levers 5, being connected to each other by means of a coiled expansion spring 8, and it will be seen upon reference to Figs. 3 and 6 of the drawings that while one of the levers 5, is being moved by the stud 3$^b$, of the lever 3, the opposite lever will be stopped as against inward movement by the projecting end of the pivot bearing 4, of the lever 3.

The switch lever 3, is also provided with oppositely arranged and extending spring contact elements or members 9, adapted to make contact with the lugs 1$^c$, of the casing marked "R" and "L" when moved to its respective shifted positions thereby in such shifted positions making circuit with the electric bell through the circuit or conduit 9$^a$, said bell conduit elements of the spring members 9, also tending to return the lever from its respective extreme shifted and contacting positions to return the lever to its neutral position when released.

When the switch lever 3, is in its normal or neutral position as indicated in Figs. 2, 8 and 10 of the drawings, the arm or spring contact member 3$^a$, of the switch lever 3, will rest upon or make contact with the contact element 10, and if it is desired to indicate on the rear signaling device that the vehicle is to be brought to a "stop" the handle 3$^b$, (marked "S") is pressed downwardly thereby bringing the handle into contact with a subjacent contact element 10$^a$, thereby making circuit with the light appearing in the "stop" panel of the signaling device, and the spring handle 3, being also brought into contact with the contact element 10$^b$, will make circuit through the conduit 9$^a$, leading to the bell, thereby simultaneously sounding the bell with the illumination of the "stop" panel.

When it is desired to indicate that the vehicle is about to take a turn to the left, the switch lever 3, is moved to the extreme right (as shown in the drawings) or into contact with the stud marked "L" thereby bringing the opposite portions of the switch lever 3, into contact with the contact elements 10$^c$, and making circuit with the light in the panel marked "Left" and simultaneously ringing the bell through the circuit 9$^a$, and the spring contact elements 9, of the lever 3, and when it is desired to indicate that the vehicle is about to turn to the right the lever 3, is shifted to its extreme left position (as shown in the drawings) and into contact with the lug marked "R" thereby making circuit with the light appearing in the panel marked "Right" through the contact elements 10$^d$, and simultaneously ringing the bell in an obvious manner and as hereinbefore explained.

As a suitable means of sounding an ordinary electric horn provided with the usual electrical connections, a spring contact plate 11, is mounted upon the insulating block 2, through the medium of a suitable attaching bolt and contact element 12, said spring having its free end mounted in suitable proximity to a second contact element 12$^a$, so that upon the depression of the centrally located button 13, (marked "H") such button coming into contact with the contact spring 11, will depress the free end of the latter and thus make contact with the contact element 12, and making circuit through the conduits 12$^b$, and sounding the horn in a well known and understood manner.

The insulating block 2, may be secured by means of a pair of attaching screws 14, passing through the base of the casing or bracket 1, and threaded into suitable threaded openings in the insulating block 2, and the top cap or cover 15, may be secured upon the casing or bracket 1, by means of a pair of attaching screws 16.

It will be seen that the stop members 15$^a$, of the cap or cover 15, form fixed contact elements for making circuit with the bell through the spring contact elements 10$^c$, on the switch lever hereinbefore described.

From the foregoing description, taken in connection with the accompanying drawings, the operation and advantages of our invention will be readily understood.

Having thus described one of the embodiments of our invention, what we claim and desire to secure by Letters Patent, is—

1. An electric switch, comprising an insulating block provided with fixed contact elements forming terminals of main and secondary circuits, a compound switch lever common to and extending between said contact elements for controlling said circuits, and means for holding said switch lever in a neutral position.

2. An electric switch, comprising a casing provided with an insulating block, diametrically opposite groups of contact elements on said block, one group forming the terminals of the main circuit and the other the terminals of the secondary circuits, a pivotally mounted switch lever arranged to make simultaneous contact between said contact elements of each of said groups, and means for returning and holding said switch lever in a normally neutral position.

3. An electric switch, comprising an insulating disk block having a centrally located pivot bearing and provided with diametrically opposite fixed contact elements, a switch lever mounted on said pivot bearing in coöperative relation to said fixed contact elements, and a pair of spring resisted pivotally mounted levers normally in engagement with said pivot bearing and coöperating with said switch lever said levers being adapted to alternately moved outwardly by the action of said switch lever while the other is held in a fixed position against said pivot bearing.

4. An electric switch, comprising an insulating block provided with fixed median and lateral contact elements forming terminals of main and secondary circuits, a switch lever common to and extending between said contact elements for controlling said circuits, means for holding said switch lever in a neutral position above said median contact elements, and spring contact elements carried by said switch lever for making circuit through said casing when said switch lever is moved to its respective shifted positions.

5. An electric switch, comprising a casing provided with oppositely arranged switch lever stop members, an insulating block therein provided with fixed contact elements forming terminals of main and secondary circuits, a common switch lever extending between said contact elements for controlling said circuits and provided with oppositely arranged spring contact elements adapted to make contact with said stop members of said casing when moved to its respective shifted positions, and spring resisted switch lever actuated levers, adapted to return and hold said switch lever in neutral position.

6. In an electric switch, the combination with an insulating block provided with an upwardly projecting pivot bearing and fixed contact elements, and a switch arm mounted on said pivot bearing in coöperative relation to said contact elements; of a pair of levers mounted on a common pivot and straddling said pivot bearing above said switch lever and normally holding the latter in a neutral position, and a spring connecting the free ends of said levers whereby the latter are adapted to be alternately moved laterally by the action of said switch lever and to coöperate with each other in returning and holding said switch lever to a common or neutral position.

7. In an electric switch, the combination with a casing provided with an insulating block and oppositely arranged switch lever stop members, a plurality of contact elements mounted on said block, and an upwardly projecting pivot bearing, a switch lever mounted on said pivot bearing in coöperative relation with said contact elements, a pair of spring resisted switch lever actuated levers mounted on a common support and straddling said upwardly projecting pivot bearing and adapted to be alternately moved outwardly while the other is held in a fixed position against said upwardly projecting pivot bearing, and a pair of laterally extending spring contact elements arranged on said switch lever and adapted to alternately make contact with said stop members of said casing as said switch lever is moved to its respective shifted positions.

8. In an electric switch, the combination with an insulating block provided with a pivot bearing and fixed contact elements, a switch lever mounted in said pivot bearing in coöperative relation to said fixed contact elements, said pivot bearing projecting above said switch lever and being centrally located with respect to said contact elements and said switch lever being provided with a stud in alinement with said upwardly projecting pivot bearing; of a pair of switch lever actuated levers mounted on a common pivot and extending over said switch lever and straddling said pivot bearing and stud and terminating at their free ends in oppositely extending arms extending laterally from said stud, and a coiled expansion spring connected to the outer ends of said arms, said upwardly projecting pivot bearing acting as a stop for said switch lever actuated levers and permitting the latter to be alternately brought into action against the resistance of said spring as said switch lever is moved to one side or the other.

In testimony whereof we have affixed our signatures in the presence of two witnesses.

FRED F. WEISHAAR.
FRED W. JACKSON.

Witnesses:
W. B. JOHNSTON,
O. C. BILLMAN.